(12) United States Patent
Kraemer et al.

(10) Patent No.: US 11,498,528 B2
(45) Date of Patent: Nov. 15, 2022

(54) WIPER BLADE DEVICE

(71) Applicant: Robert Bosch GmbH, Stuttgart (DE)

(72) Inventors: Godelieve Kraemer, Huegelsheim (DE); Harald Rapp, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/961,269

(22) PCT Filed: Nov. 8, 2018

(86) PCT No.: PCT/EP2018/080559
§ 371 (c)(1),
(2) Date: Jul. 10, 2020

(87) PCT Pub. No.: WO2019/137649
PCT Pub. Date: Jul. 18, 2019

(65) Prior Publication Data
US 2021/0061236 A1     Mar. 4, 2021

(30) Foreign Application Priority Data

Jan. 11, 2018   (DE) ................... 10 2018 200 316.5

(51) Int. Cl.
*B60S 1/52*     (2006.01)
*B60S 1/38*     (2006.01)
(52) U.S. Cl.
CPC ............ *B60S 1/524* (2013.01); *B60S 1/381* (2013.01)
(58) Field of Classification Search
CPC .................................. B60S 1/524; B60S 1/381
See application file for complete search history.

(56) References Cited

U.S. PATENT DOCUMENTS

| 7,228,588 B2 * | 6/2007 | Kraemer ............... B60S 1/3877 |
| | | 15/250.201 |
| 7,540,061 B1 | 6/2009 | Huang |
| 2008/0263806 A1 | 10/2008 | Egner-Walter et al. |
| 2011/0185531 A1 | 8/2011 | Egner-Walker et al. |

(Continued)

FOREIGN PATENT DOCUMENTS

| CA | 2879853 A1 * | 2/2014 | ............ B60S 1/4048 |
| DE | 10323998 A1 * | 12/2004 | ............. B60S 1/381 |
| DE | 102005030972 A1 | 1/2007 | |

(Continued)

OTHER PUBLICATIONS

DE 10323998 A1 (Year: 2004).*

(Continued)

*Primary Examiner* — Andrew A Horton
(74) *Attorney, Agent, or Firm* — Michael Best & Friedrich LLP

(57) ABSTRACT

The invention relates to a wiper blade device for a windshield wiper (12a), comprising a spoiler unit (14a; 14b; 14c), which has at least one soft spoiler component (16a; 16b; 16c) and at least one hard spoiler component (18a; 18b; 18c), wherein the hard spoiler component (16a; 16b; 16c) forms a receiving area (20a; 20b; 20c) for a spring rail, at least partially. The wiper blade device further comprises a spray unit (22a; 22b; 22c). According to the invention, the spray unit (22a; 22b; 22c) has at least one first duct element (24a; 24b; 24c), which is integrally molded, at least partially, to the hard spoiler component (18a; 18b; 18c).

15 Claims, 3 Drawing Sheets

(56) References Cited

U.S. PATENT DOCUMENTS

2015/0175133 A1    6/2015   Caillot et al.
2015/0239434 A1    8/2015   Caillot et al.

FOREIGN PATENT DOCUMENTS

| | | |
|---|---|---|
| DE | 102006013900 | 9/2007 |
| DE | 102007030169 | 1/2009 |
| DE | 102009016603 | 12/2009 |
| DE | 102008049269 | 4/2010 |
| DE | 102009004943 | 7/2010 |
| DE | 102009059117 | 6/2011 |
| DE | 102011078197 | 1/2013 |
| EP | 2415645 | 2/2012 |
| WO | 2004054859 A1 | 7/2004 |
| WO | 2007000346 | 1/2007 |
| WO | 2009118286 | 10/2009 |
| WO | 2010034447 A1 | 4/2010 |
| WO | 2013186498 | 12/2013 |

OTHER PUBLICATIONS

International Search Report for Application No. PCT/EP2018/080559 dated Jan. 29, 2019 (English Translation, 2 pages).

* cited by examiner

WIPER BLADE DEVICE

BACKGROUND

A wiper blade device for a windshield wiper, comprising a spoiler unit, which has at least one soft spoiler component and at least one hard spoiler component, wherein the hard spoiler component forms a receiving area for a spring rail, at least partially, and comprising a spray unit, has already been proposed.

SUMMARY

The invention is based on a wiper blade device for a windshield wiper comprising a spoiler unit, which has at least one soft spoiler component and at least one hard spoiler component, wherein the hard spoiler component forms a receiving area for a spring rail, at least partially, and comprising a spray unit.

It is proposed that the spray unit has at least one first duct element which is integrally molded, at least partially, to the hard spoiler component.

The spoiler unit is preferably formed from at least two different materials, in particular from at least two different plastics materials. Preferably, the soft spoiler component of the spoiler unit is formed from a first material, in particular from a first plastics material. Preferably, the hard spoiler component of the spoiler unit is formed from a second material, in particular from a second plastics material. In particular, the second material is harder, in particular more torsionally stiff, than the first material. Preferably, the spoiler unit is produced in a coextrusion method in which, in particular, the first material and the second material are combined together. In particular, the soft spoiler component and the hard spoiler component are connected together by a material connection, in particular are formed in one piece. The soft spoiler component preferably forms a spoiler extension which is provided, in particular, as a result of driving wind, to generate a contact force which is oriented in the direction of a surface to be wiped, in particular a windshield. Preferably, the soft spoiler component may be formed asymmetrically, in particular viewed along a main direction of extent of the wiper blade device. A "main direction of extent" of an object is intended to be understood as a direction which runs parallel to a longest edge of a smallest geometric cuboid which only just completely encloses the object. The soft spoiler component is preferably provided for generating a contact pressure from a driving wind. The receiving area for the spring rail is formed, in particular, as a recess in the hard spoiler component. Preferably, the receiving area has a polygonal, in particular rectangular, cross section. Preferably, the receiving area extends at least substantially along the entire extent of the wiper blade device along the main direction of extent of the wiper blade device. The receiving area is preferably provided for at least partially receiving a wiper strip. "Provided" is intended to be understood, in particular, as specifically designed and/or equipped. "An object being provided for a specific function" is intended to be understood, in particular, as the object fulfilling and/or performing this specific function in at least one use state and/or operating state.

The spray unit, in particular the first duct element of the spray unit, is preferably provided for dispensing and/or guiding a cleaning fluid, in particular a wiper fluid. Preferably, the spray unit has a plurality of first duct elements. The first duct elements are preferably arranged along the main direction of extent of the wiper blade device, in particular equidistant to one another. Preferably, the first duct elements are formed as tubular recesses. In particular, the first duct elements are partially arranged inside the hard spoiler component, preferably entirely inside the hard spoiler component. Preferably, at least dispensing openings of the first duct elements are arranged entirely inside the hard spoiler component.

Advantageously, a wiper blade device with particularly dimensionally stable first duct elements may be provided by the design of the wiper blade device according to the invention. Advantageously, the first duct elements may be configured to be at least substantially wear-resistant, in particular resistant to calcification. Advantageously, a low maintenance wiper blade device which permits a particularly accurate dispensing of a cleaning fluid may be provided.

Moreover, it is proposed that the at least partially integrally molded first duct element at least partially forms a spray nozzle element of the spray unit. Preferably, all of the at least partially integrally molded first duct elements at least partially form spray nozzle elements of the spray unit. Preferably, the first duct elements form spray nozzle elements in a region of the dispensing openings of the first duct elements. Preferably, the cleaning fluid is dispensed through the first duct elements forming the spray nozzle elements at an overpressure which is, in particular, greater than an atmospheric pressure of an environment surrounding the wiper blade device. In particular, the spray nozzle elements may be configured such that the cleaning fluid is atomized when dispensed from the spray nozzle elements. Advantageously, a targeted, and at the same time extensive, dispensing of cleaning fluid may be achieved.

It is further proposed that the first duct element has a main direction of extent at least substantially parallel to a vertical direction of extent of the spoiler unit. In particular, all of the first duct elements have a main direction of extent at least substantially parallel to the vertical direction of extent of the spoiler unit. The vertical direction of extent of the spoiler unit runs, in particular, at least substantially perpendicular to a main extension plane of the receiving area for the spring rail. "Substantially parallel" is intended to be understood, in particular, as an orientation of a direction relative to a reference direction, in particular in one plane, wherein the direction has a deviation relative to the reference direction, in particular, of less than 8°, advantageously of less than 5° and particularly advantageously of less than 2°. The expression "substantially perpendicular" is intended to define, in particular, an orientation of a direction relative to a reference direction, wherein the direction and the reference direction, in particular viewed in one plane, enclose an angle of 90° and the angle has a maximum deviation, in particular, of less than 8°, advantageously of less than 5° and particularly advantageously of less than 2°. A "main extension plane" of an object is intended to be understood, in particular, as a plane which is parallel to a largest side surface of a smallest imaginary cuboid which only just completely encloses the structural unit and, in particular, runs through the center point of the cuboid. Preferably, in a state of the wiper blade device mounted on a motor vehicle windshield, the main direction of extent of the first duct elements runs at least substantially perpendicular to a surface of the motor vehicle windshield. Advantageously, it is possible to achieve an at least substantially perpendicular dispensing of the cleaning fluid onto the motor vehicle windshield.

It is further proposed that the first duct element is arranged in a vertical direction of extent of the spoiler unit so as to overlap at least partially with the receiving area of the spring rail. Preferably, all of the first duct elements are arranged in the vertical direction of extent of the spoiler unit so as to overlap at least partially with the receiving area of the spring rail. In particular, the first duct elements have a main direction of extent in a vertical direction of extent of the receiving area. The vertical direction of extent of the receiving area runs, in particular, at least substantially parallel to the vertical direction of extent of the spoiler unit. Preferably, the main direction of extent of the first duct elements runs at least substantially parallel to the vertical direction of extent of the receiving area. Advantageously, an accurate guidance of the cleaning fluid through the first duct elements may be achieved.

It is further proposed that the first duct element is arranged so as to be at least partially offset relative to the receiving area of the spring rail in a transverse direction of extent of the spoiler unit. Preferably, all of the first duct elements are arranged so as to be at least partially offset relative to the receiving area of the spring rail in the transverse direction of extent of the spoiler unit. The transverse direction of extent of the spoiler unit runs, in particular, at least substantially perpendicular to the main direction of extent of the wiper blade device and, in particular, at least substantially perpendicular to the vertical direction of extent of the spoiler unit. Preferably, in the transverse direction of extent of the spoiler unit the first channel elements are at least partially separated from the receiving area by the hard spoiler component. In particular, in the transverse direction of extent of the spoiler unit the first duct elements are entirely separated from the receiving area by the hard spoiler component. Alternatively, it is conceivable that in the transverse direction of extent of the spoiler unit the first duct elements are at least partially separated by the soft spoiler component from the receiving area. Advantageously, a spatial separation may be achieved between the first duct elements and the receiving area. The first duct elements may be advantageously of robust configuration.

It is further proposed that the soft spoiler component at least partially forms at least one duct of the spray unit, said duct being directly connected to the first duct element. Preferably, the soft spoiler component at least partially forms at least one duct of the spray unit, said duct being directly connected to all of the first duct elements. Preferably, the duct runs at least substantially parallel to the main direction of extent of the wiper blade device. Preferably, the duct extends at least substantially along the entire extent of the spoiler unit along the main direction of extent of the wiper blade device. The duct is formed, in particular, as a preferably tubular recess in the soft spoiler component. The duct is preferably provided for guiding through the cleaning fluid. In particular, the cleaning fluid may be delivered, in particular pumped, for example from a reservoir unit of a motor vehicle or the like, through the duct. Preferably, the duct has specifically two end pieces. Preferably, the duct is sealed at a first end piece in an at least substantially fluid-tight manner. Preferably, the duct is connected at a second end piece to a supply element, such as for example a tube, a pipe or the like. In particular, the cleaning fluid is supplied, for example, from the reservoir unit to the duct by the supply element. Preferably, viewed in the vertical direction of extent of the spoiler unit, the duct is arranged above the first duct elements. Preferably, the cleaning fluid is forced out of the duct into the first duct elements and dispensed through the first duct elements at an overpressure, in particular in comparison with an atmospheric pressure of the environment surrounding the wiper blade device. Preferably, the first duct elements are arranged at least substantially along the entire channel, in particular equidistant to one another. Advantageously, an efficient supply of cleaning fluid to the first duct elements may be possible.

It is further proposed that the first duct element is defined by a wall of the receiving area of the spring rail, wherein the wall at least partially defines the receiving area on a side of the wall remote from the spray nozzle element. Preferably, all of the first duct elements are defined by the wall of the receiving area of the spring rail, wherein the wall at least partially defines the receiving area on the side of the wall remote from the spray nozzle elements. The wall defines the receiving area on the side of the wall remote from the spray nozzle elements, preferably in the transverse direction of extent of the spoiler unit. In particular, the first duct elements may be at least partially integrally molded to the wall of the receiving area, preferably along the entire vertical extent of the first duct elements. The vertical extent of the first duct elements, in particular, is an extent of the first duct elements along the main direction of extent of the first duct elements. A wiper blade device which is advantageously slim and, in particular, aerodynamic may be provided along the transverse direction of extent of the spoiler unit.

It is also proposed that the spray unit has at least one second duct element which is arranged on a side of the receiving area remote from the first duct element. Preferably the spray unit has a plurality of second duct elements which are arranged on the side of the receiving area remote from the first duct element. In particular, the second duct elements are formed in an at least substantially similar manner to the first duct elements. The second duct elements are preferably provided for dispensing the cleaning fluid. Preferably, the spray unit comprises a second duct which is arranged, in particular, on the side of the receiving area remote from the first duct elements. Preferably, the second duct is formed in an at least substantially similar manner to the duct which is connected to the first duct elements. In particular, the second duct is directly connected to the second duct elements. The second duct is preferably provided for guiding through the cleaning fluid. Preferably, the second duct elements and the second duct are arranged around the receiving area at least substantially mirror-symmetrically to the first duct elements and the duct which is connected to the first duct elements. Advantageously, cleaning fluid may be dispensed on two sides of the receiving area, in particular simultaneously. Advantageously, during an operation of the wiper blade device the cleaning fluid may be dispensed in both wiping directions spatially upstream of a wiper lip of a windshield wiper. Advantageously, a particularly thorough cleaning of a motor vehicle windshield may be achieved.

The invention is also based on a wiper blade comprising a wiper blade device according to the invention. Preferably, the wiper blade comprises further components which are required, in particular, for an operation of the wiper blade. In particular, the wiper blade comprises the spring rail which is, in particular, inserted into the receiving area. Preferably, the spring rail is formed at least partially from a spring steel. Preferably, in an unloaded state the spring rail has substantially the shape of a curved bar and particularly advantageously a flattened, curved bar. Particularly advantageously, in an unloaded state a curvature of the spring rail along a longitudinal extent is greater than a curvature of a vehicle surface of a motor vehicle, in particular a motor vehicle windshield, over which the spring rail is guided in at least one operating state. An "extent" of an element is intended to be understood, in particular, as a maximum spacing of two points of a perpendicular projection of the element onto a plane. In particular, the wiper blade comprises a wiper strip which is inserted, in particular, at least partially into the receiving area. A "wiper strip" is intended to be understood, in particular, as a unit made of a resilient material with a wiper lip which, for cleaning a surface to be cleaned, in particular a windshield surface, preferably a vehicle windshield, is provided to be moved in contact over the surface to be cleaned. Preferably, the wiper strip is produced from a natural or synthetic elastomer, in particular from rubber. Advantageously, a low maintenance wiper blade which permits a particularly accurate dispensing of a cleaning fluid may be provided.

The invention is further based on a windshield wiper comprising a wiper blade according to the invention. Preferably, the windshield wiper comprises further components which are required, in particular, for an operation of the windshield wiper. In particular, the windshield wiper comprises an adapter unit for mounting the wiper blade on a windshield wiper drive unit of a motor vehicle. Advantageously, a windshield wiper may be provided with an integrated cleaning fluid dispensing function.

The wiper blade device according to the invention, the wiper blade according to the invention, the spoiler unit according to the invention, the spray unit according to the invention and/or the windshield wiper according to the invention is/are not intended to be limited in this case to the above-described use and embodiment. In particular, the spoiler unit according to the invention, the spray unit according to the invention and/or the windshield wiper according to the invention may have a number of individual elements, components and units which is different from the number cited herein, in order to fulfill a mode of operation described herein. Additionally, in the case of the value ranges specified in this disclosure, values lying within the cited limits are also to be intended to be regarded as disclosed and able to be used as desired.

BRIEF DESCRIPTION OF THE DRAWINGS

Further advantages are disclosed in the following description of the drawings. Three exemplary embodiments of the invention are shown in the drawings. The drawings, the description and the claims contain numerous features combined together. The person skilled in the art will also expediently consider the features individually and combine them together to form further meaningful combinations.

In the drawings.

DETAILED DESCRIPTION

Figure 1:
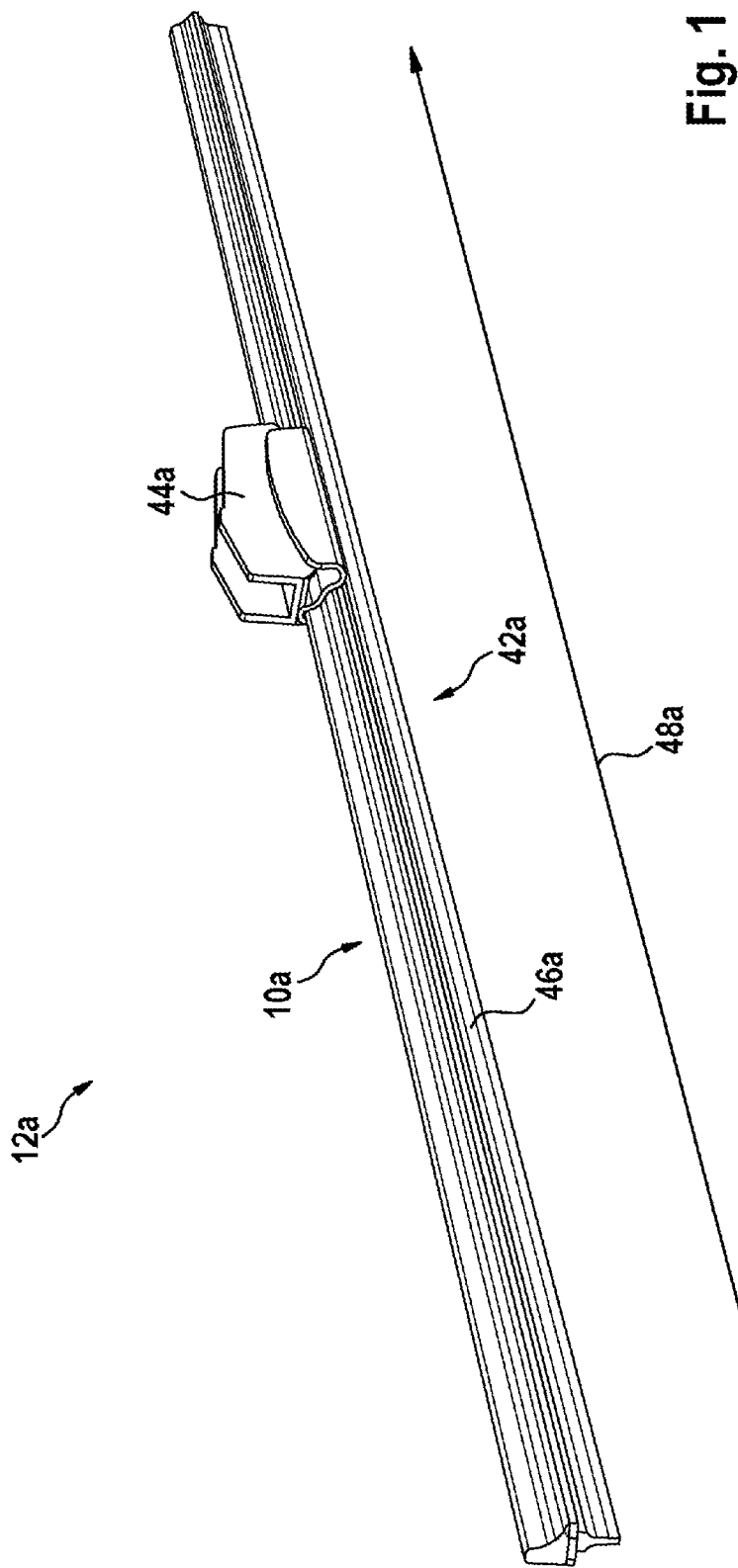
FIG. 1 shows a windshield wiper according to the invention in a perspective view.

FIG. 1 shows a windshield wiper 12a in a perspective view. The windshield wiper 12a comprises a wiper blade 42a. The windshield wiper 12a comprises an adapter unit 44a for mounting the wiper blade 42a on a windshield wiper drive unit of a motor vehicle. The wiper blade 42a has a wiper blade device 10a. The wiper blade 42a has a spring rail, not shown further. The wiper blade 42a has a wiper strip 46a. The spring rail and a part of the wiper strip 46a are inserted into a receiving area 20a of the wiper blade device 10a, not shown further.

Figure 2:
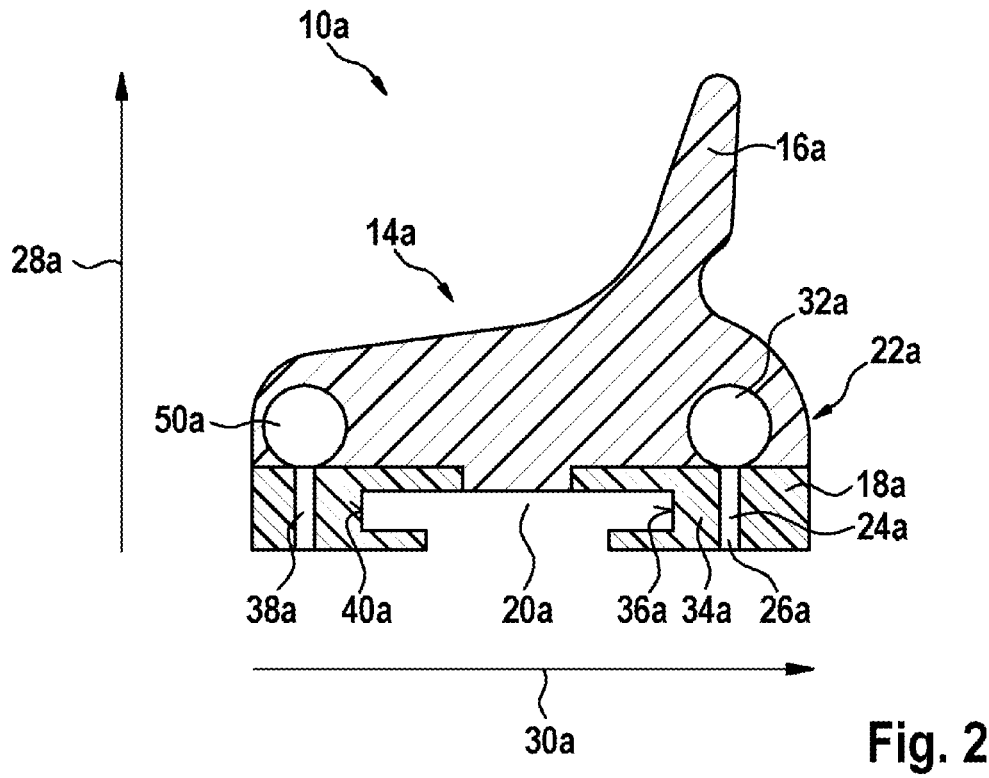
FIG. 2 shows a wiper blade device according to the invention in a schematic sectional view.

FIG. 2 shows the wiper blade device 10a for the windshield wiper 12a in a schematic sectional view. A cutting plane, which is shown, is located perpendicular to a main direction of extent 48a of the wiper blade device 10a (see FIG. 1). The wiper blade device 10a comprises a spoiler unit 14a. The spoiler unit 14a has a soft spoiler component 16a and a hard spoiler component 18a. The soft spoiler component 16a, viewed along a vertical direction of extent 28a of the spoiler unit 14a, is arranged above the hard spoiler component 18a. The soft spoiler component 16a and the hard spoiler component 18a are produced from different plastics materials. The different plastics materials are combined together in a coextrusion method. The soft spoiler component 16a and the hard spoiler component 18a are configured in one piece. The hard spoiler component 18a partially forms the receiving area 20a for the spring rail. The receiving area 20a is formed as a recess in the hard spoiler component 18a. The receiving area 20a has a rectangular cross section. The receiving area 20a extends along the entire main direction of extent 48a of the wiper blade device 10a. The soft spoiler component 16a forms a spoiler extension. The soft spoiler component 16a is formed asymmetrically when viewed along the main direction of extent 48a of the wiper blade device 10a. The soft spoiler component 16a is provided for generating a contact pressure from a driving wind.

The wiper blade device 10a has a spray unit 22a. The spray unit 22a comprises a first duct element 24a. The first duct element 24a is integrally molded to the hard spoiler component 18a. The first duct element 24a is entirely integrally molded to the hard spoiler component 18a. The spray unit 22a has a plurality of first duct elements 24a. The first duct elements 24a are arranged along the main direction of extent 48a of the wiper blade device 10a. The first duct elements 24a are arranged equidistant to one another along the main direction of extent 48a of the wiper blade device 10a. The first duct element 24a is formed as a pipe-shaped recess. The first duct element 24a is formed as a pipe-shaped recess inside the hard spoiler component 18a. The first duct element 24a is provided for dispensing and/or guiding a cleaning fluid. The cleaning fluid is formed as a wiper fluid. The first duct element 24a is formed partially as a spray nozzle element 26a of the spray unit 22a. The first duct element 24a is formed on a dispensing opening of the first duct element 24a as a spray nozzle element 26a. The dispensing of cleaning fluid through the spray nozzle element 26a is carried out at an overpressure. The overpressure is greater than an atmospheric pressure of an environment surrounding the wiper blade device 10a.

The first duct element 24a has a main direction of extent substantially parallel to the vertical direction of extent 28a of the spoiler unit 14a. The main direction of extent of the first duct element 24a, in a state of the windshield wiper 12a mounted on a motor vehicle windshield, runs substantially perpendicular to a surface of the motor vehicle windshield. The first duct element 24a is arranged in the vertical direction of extent 28a of the spoiler unit 14a so as to overlap with the receiving area 20a of the spring rail. The first duct element 24a is arranged in the vertical direction of extent 28a of the spoiler unit 14a so as to overlap entirely with the receiving area 20a of the spring rail. Alternatively, it is conceivable that the first duct element 24a is arranged in the vertical direction of extent 28a of the spoiler unit 14a so as to overlap partially with the receiving area 20a of the spring rail. The main direction of extent of the first duct element 24a runs substantially parallel to a vertical direction of extent of the receiving area 20a. The vertical direction of extent of the receiving area 20a runs substantially parallel to the vertical direction of extent 28a of the spoiler unit 14a.

The first duct element 24a is arranged so as to be offset relative to the receiving area 20a of the spring rail in a transverse direction of extent 30a of the spoiler unit 14a. The first duct element 24a is arranged so as to be entirely offset relative to the receiving area 20a of the spring rail in the transverse direction of extent 30a of the spoiler unit 14a. Alternatively, it is conceivable that the first duct element 24a is arranged so as to be partially offset relative to the receiving area 20a of the spring rail in the transverse direction of extent 30a of the spoiler unit 14a. The first duct element 24a is entirely separated by the hard spoiler component 18a from the receiving area 20a in the transverse direction of extent 30a of the spoiler unit 14a.

The soft spoiler component 16a forms a duct 32a of the spray unit 22a. The soft spoiler component 16a entirely forms the duct 32a of the spray unit 22a. Alternatively, it is conceivable that the soft spoiler component 16a partially forms the duct 32a of the spray unit 22a. The duct 32a is directly connected to the first duct element 24a. The duct 32a runs substantially parallel to the main direction of extent 48a of the wiper blade device 10a. The duct 32a extends substantially along the entire extent of the spoiler unit 14a along the main direction of extent 48a of the wiper blade device 10a. The duct 32a is formed as a recess in the soft spoiler component 16a. The duct 32a is formed as a tubular recess in the soft spoiler component 16a. The duct 32a is provided for guiding through the cleaning fluid. The cleaning fluid may be delivered through the duct 32a. The cleaning fluid is supplied to the duct 32a through a supply element, not shown further. The duct 32a is arranged above the first duct element 24a, when viewed along the vertical direction of extent 28a of the spoiler unit 14a. The cleaning fluid is forced out of the duct 32a into the first duct element 24a and dispensed through the first duct element 24a at an overpressure, in comparison with an atmospheric pressure of the environment surrounding the wiper blade device 10a. The plurality of first duct elements 24a are arranged equidistant to one another substantially along the entire duct 32a.

The first duct element 24a is defined by a wall 34a of the receiving area 20a of the spring rail. The wall 34a partially defines the receiving area 20a on a side 36a of the wall 34a remote from the spray nozzle element 26a. The wall 34a defines the receiving area 20a on the side 36a of the wall 34a remote from the spray nozzle element 26a, along the transverse direction of extent 30a of the spoiler unit 14a.

The spray unit 22a has a second duct element 38a. The second duct element 38a is arranged on a side 40a of the receiving area 20a remote from the first duct element 24a. The spray unit 22a has a plurality of second duct elements 38a. The second duct elements 38a are arranged along the entire main direction of extent 48a of the wiper blade device 10a. The second duct elements 38a are arranged equidistant to one another along the main direction of extent 48a of the wiper blade device 10a. The second duct element 38a is formed in a substantially similar manner to the first duct element 24a. The second duct element 38a is provided for dispensing the cleaning fluid. The spray unit 22a comprises a second duct 50a. The second duct 50a is arranged on the side 40a of the receiving area 20a remote from the first duct element 24a. The second duct 50a is formed in a substantially similar manner to the duct 32a which is connected to the first duct element 24a. The second duct 50a is directly connected to the second duct element 38a. The second duct 50a is provided for guiding through the cleaning fluid. The second duct element 38a and the second duct 50a are arranged around the receiving area 20a substantially mirror-symmetrically to the first duct element 24a and the duct 32a which is connected to the first duct element 24a.

Figure 3:
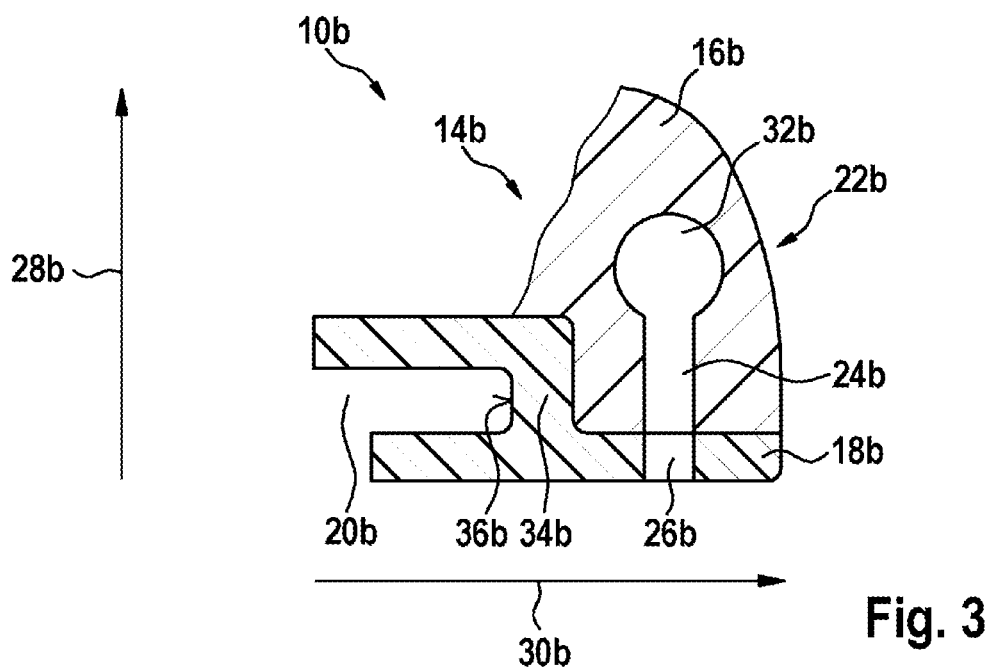
FIG. 3 shows a part of an alternative wiper blade device in a schematic sectional view and FIG. 4 shows a part of a further alternative wiper blade device in a schematic sectional view.
Figure 4:
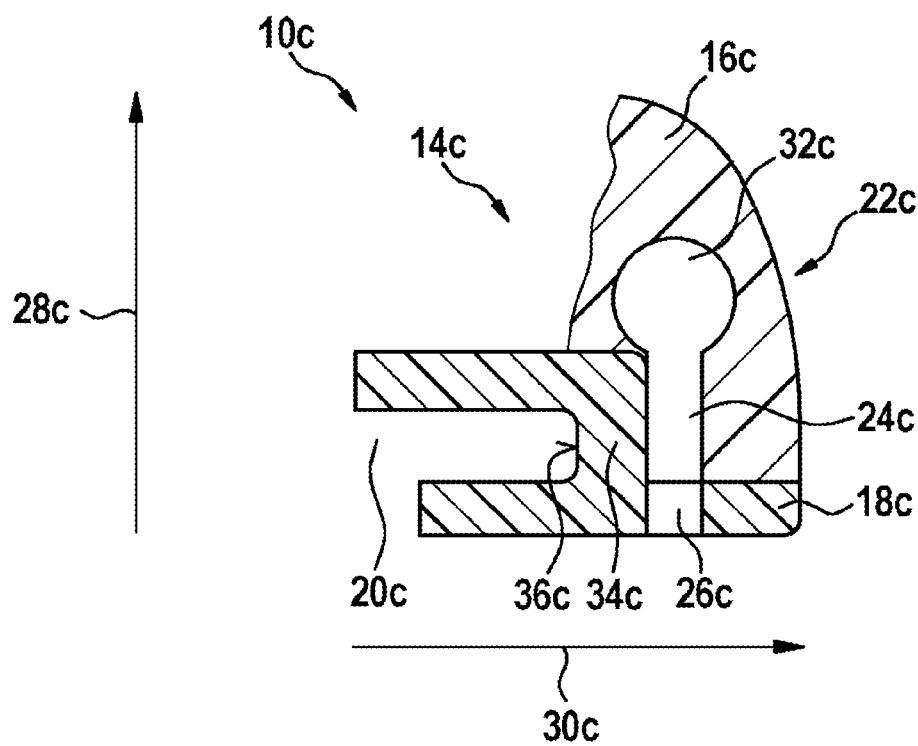

Two further exemplary embodiments of the invention are shown in FIGS. 3 and 4. The following descriptions and the drawings are substantially limited to the differences between the exemplary embodiments, wherein relative to components denoted the same, in particular with reference to components with the same reference numerals, in principle reference may also be made to the drawings and/or the description of the other exemplary embodiments, in particular of FIGS. 1 and 2. In order to differentiate between the exemplary embodiments, the letter a is added to the reference numerals of the exemplary embodiment in FIGS. 1 and 2. In the exemplary embodiments of FIGS. 3 and 4 the letter a is replaced by the letters b and c.

FIG. 3 shows a part of an alternative wiper blade device 10a in a schematic sectional view. The wiper blade device 10b comprises a spoiler unit 14b. The spoiler unit 14b has a soft spoiler component 16b and a hard spoiler component 18b. The hard spoiler component 18b partially forms a receiving area 20b for a spring rail. The wiper blade device 10b comprises a spray unit 22b. The spray unit 22b has a first duct element 24b. The first duct element 24b is partially integrally molded to the hard spoiler component 18b. The first duct element 24b is partially integrally molded to the soft spoiler component 16b. The partially integrally molded first duct element 24b partially forms a spray nozzle element 26b of the spray unit 22b. The first duct element 24b forms a spray nozzle element 26b of the spray unit 22b in a portion of the first duct element 24b in which the first duct element 24b is integrally molded to the hard spoiler component 18b. The first duct element 24b is arranged so as to be offset relative to the receiving area 20a of the spring rail in a transverse direction of extent 30b of the spoiler unit 14b. The first duct element 24b is partially separated by the soft spoiler component 16b from the receiving area 20b in the transverse direction of extent 30b of the spoiler unit 14b. The first duct element 24b is partially separated by the hard spoiler component 18b from the receiving area 20b in the transverse direction of extent 30b of the spoiler unit 14b.

The spray unit 22b has a second duct element 38b. The second duct element 38b is formed in a substantially similar manner to the first duct element 24b. The second duct element 38b is arranged on a side 40b of the receiving area 20b remote from the first duct element 24b. The spray unit 22b has a second duct 50b. The second duct 50b is formed in a substantially similar manner to the duct 32b which is connected to the first duct element 24b. The second duct 50b is arranged on the side 40b of the receiving area 20b remote from the first duct element 24b. The side 40b of the receiving area 20b remote from the first duct element 24b is not shown further.

FIG. 4 shows a part of a further alternative wiper blade device 10c in a schematic sectional view. The wiper blade device 10c comprises a spoiler unit 14c. The spoiler unit 14c has a soft spoiler component 16c and a hard spoiler component 18c. The hard spoiler component 18c partially forms a receiving area 20c for a spring rail. The wiper blade device 10c comprises a spray unit 22c. The spray unit 22c has a first duct element 24c. The first duct element 24c is partially integrally molded to the hard spoiler component 18c. The first duct element 24c is partially integrally molded over half of the periphery to the hard spoiler component 18c. The first duct element 24c is partially integrally molded to the soft spoiler component 16c. The partially integrally molded first duct element 24c partially forms a spray nozzle element 26c of the spray unit 22c. The first duct element 24c forms a spray nozzle element 26c of the spray unit 22c in a portion of the first duct element 24c in which the first duct element 24c is fully integrally molded to the hard spoiler component 18c. The first duct element 24c is defined by a wall 34c of the receiving area 20c of the spring rail. The wall 34c partially defines the receiving area 20c on a side 36c of the wall 34c remote from the spray nozzle element 26c. The wall 34c defines the receiving area 20c on the side 36c of the wall 34c remote from the spray nozzle element 26c along the transverse direction of extent 30c of the spoiler unit 14c.

The spray unit 22c has a second duct element 38c. The second duct element 38c is formed in a substantially similar manner to the first duct element 24c. The second duct element 38c is arranged on a side 40c of the receiving area 20c remote from the first duct element 24c. The spray unit 22c has a second duct 50c. The second duct 50c is formed in a substantially similar manner to the duct 32c which is connected to the first duct element 24c. The second duct 50c is arranged on the side 40c of the receiving area 20c remote from the first duct element 24c. The side 40c of the receiver area 20c remote from the first duct element 24c is not shown further.

What is claimed is:

1. A wiper blade device for a windshield wiper (12a) comprising a spoiler unit (14a; 14b; 14c), which has at least one soft spoiler component (16a; 16b; 16c) and at least one hard spoiler component (18a; 18b; 18c), wherein the hard spoiler component (18a; 18b; 18c) forms a receiving area (20a; 20b; 20c) for a spring rail, at least partially, and comprising a spray unit (22a; 22b; 22c), characterized in that the spray unit (22a; 22b; 22c) has at least one first duct element (24a; 24b; 24c) which is integrally molded, at least partially, to the hard spoiler component (18a; 18b; 18c), wherein the soft spoiler component (16a; 16b; 16c) at least partially forms at least one duct (32a; 32b; 32c) of the spray unit (22a; 22b; 22c), said duct (32a; 32b; 32c) being adjacent to and opening into the first duct element (24a; 24b; 24c), wherein the first duct element (24a; 24b; 24c) extends parallel to a vertical direction of extent (28a; 28b; 28c) of the spoiler unit (14a; 14b; 14c), wherein the vertical direction of extent (28a, 28b, 28c) is at least substantially perpendicular to a main extension plane of the receiving area (20a; 20b; 20c) for the spring rail, and wherein the vertical direction of extent (28a, 28b, 28c) is configured to be perpendicular to a motor windshield when the wiper blade device is in use.

2. The wiper blade device as claimed in claim 1, characterized in that the at least partially integrally molded first duct element (24a; 24b; 24c) at least partially forms a spray nozzle element (26a; 26b; 26c) of the spray unit (22a; 22b; 22c).

3. The wiper blade device as claimed in claim 1, characterized in that the first duct element (24a; 24b; 24c) is arranged in a vertical direction of extent (28a; 28b; 28c) of the spoiler unit (14a; 14b; 14c) so as to overlap at least partially with the receiving area (20a; 20b; 20c) of the spring rail.

4. The wiper blade device as claimed in claim 1, characterized in that the first duct element (24a; 24b; 24c) is arranged so as to be at least partially offset relative to the receiving area (20a; 20b; 20c) of the spring rail in a transverse direction of extent (30a; 30b; 30c) of the spoiler unit (14a; 14b; 14c).

5. The wiper blade device as claimed in claim 2, characterized in that the first duct element (24a; 24c) is defined by a wall (34a; 34c) of the receiving area (20a; 20c) of the spring rail, wherein the wall (34a; 34c) at least partially defines the receiving area (20a; 20c) on a side (36a; 36c) of the wall (34a; 34c) remote from the spray nozzle element (26a; 26c).

6. The wiper blade device as claimed in claim 1, characterized in that the spray unit (22a; 22b; 22c) has at least one second duct element (38a; 38b; 38c) which is arranged on a side (40a; 40b; 40c) of the receiving area (20a; 20b; 20c) remote from the first duct element (24a; 24b; 24c).

7. A wiper blade comprising a wiper blade device (10a; 10b; 10c) as claimed in claim 1.

8. A windshield wiper (12a) comprising a wiper blade (42a) as claimed in claim 7.

9. The wiper blade device as claimed in claim 1, wherein the first duct element (24a; 24b; 24c) is elongated.

10. The wiper blade device as claimed in claim 1, wherein first duct element (24a; 24b; 24c) extends vertically directly underneath the at least one duct (32a; 32b; 32c) and at least partially forms a spray nozzle element (26a; 26b; 26c) of the spray unit (22a; 22b; 22c), wherein the spray nozzle element (26a; 26b; 26c) opens along a bottom surface of the hard spoiler component (18a; 18b; 18c) so as to direct fluid out below the hard spoiler component (18a; 18b; 18c).

11. The wiper blade device as claimed in claim 1, further comprising the spring rail, wherein the spring rail is disposed within the receiving area (20a; 20b; 20c) in the hard spoiler component (18a; 18b; 18c).

12. A wiper blade comprising a wiper blade device (10a; 10b; 10c) as claimed in claim 11.

13. A windshield wiper (12a) comprising a wiper blade (42a) as claimed in claim 12.

14. The wiper blade device as claimed in claim 1, wherein an entirety of the first duct element (24a; 24b; 24c) is disposed within the hard spoiler component (18a; 18b; 18c) and an entirety of the duct (32a; 32b; 32c) is disposed within the soft spoiler component (16a; 16b; 16c).

15. A wiper blade device for a windshield wiper (12a) comprising a spoiler unit (14a; 14b; 14c), which has at least one soft spoiler component (16a; 16b; 16c) and at least one hard spoiler component (18a; 18b; 18c), wherein the hard spoiler component (18a; 18b; 18c) forms a receiving area (20a; 20b; 20c) for a spring rail, at least partially, and comprising a spray unit (22a; 22b; 22c), characterized in that the spray unit (22a; 22b; 22c) has at least one first duct element (24a; 24b; 24c) which is integrally molded, at least partially, to the hard spoiler component (18a; 18b; 18c), wherein the soft spoiler component (16a; 16b; 16c) at least partially forms at least one duct (32a; 32b; 32c) of the spray unit (22a; 22b; 22c), said duct (32a; 32b; 32c) being adjacent to and opening into the first duct element (24a; 24b; 24c), wherein an entirety of the first duct element (24a; 24b; 24c) is disposed within the hard spoiler component (18a; 18b; 18c) and an entirety of the duct (32a; 32b; 32c) is disposed within the soft spoiler component (16a; 16b; 16c).

* * * * *